(12) United States Patent
Segal et al.

(10) Patent No.: US 10,068,083 B2
(45) Date of Patent: Sep. 4, 2018

(54) SECURE TRANSPORT OF WEB FORM SUBMISSIONS

(71) Applicant: International Business Machines Corporation, Armonk, NY (US)

(72) Inventors: Ory Segal, Tel Aviv (IL); Orli Gan, Tel Aviv (IL)

(73) Assignee: International Business Machines Corporation, Armonk, NY (US)

(*) Notice: Subject to any disclaimer, the term of this patent is extended or adjusted under 35 U.S.C. 154(b) by 129 days.

(21) Appl. No.: 13/629,902

(22) Filed: Sep. 28, 2012

(65) Prior Publication Data

US 2014/0096259 A1    Apr. 3, 2014

(51) Int. Cl.
| | |
|---|---|
| G06F 7/04 | (2006.01) |
| G06F 17/30 | (2006.01) |
| H04N 7/16 | (2011.01) |
| G06F 21/42 | (2013.01) |
| H04L 29/06 | (2006.01) |

(52) U.S. Cl.
CPC .......... *G06F 21/42* (2013.01); *H04L 63/0823* (2013.01); *H04L 63/168* (2013.01); *H04L 63/205* (2013.01)

(58) Field of Classification Search
CPC .................................. G06F 21/00; G06F 21/42
USPC .......................................................... 726/26
See application file for complete search history.

(56) References Cited

U.S. PATENT DOCUMENTS

| | | | | |
|---|---|---|---|---|
| 6,105,012 | A * | 8/2000 | Chang | G06Q 20/00 380/277 |
| 6,601,170 | B1 * | 7/2003 | Wallace, Jr. | H04L 63/0428 713/165 |
| 7,865,729 | B2 * | 1/2011 | Pritikin | G06F 17/243 705/70 |
| 8,078,739 | B1 * | 12/2011 | Somasundaram | H04L 63/0209 709/224 |
| 8,122,251 | B2 | 2/2012 | Santos et al. | |
| 8,131,822 | B2 * | 3/2012 | Srinivasan | H04L 63/105 709/218 |
| 8,146,164 | B2 | 3/2012 | Eshun et al. | |
| 8,296,477 | B1 * | 10/2012 | Polk | G06Q 99/00 705/35 |

(Continued)

FOREIGN PATENT DOCUMENTS

CN        102307197 A        1/2012

OTHER PUBLICATIONS

Whalen, Tara, et al, "Gathering Evidence: Use of Visual Security Cues in Web Browsers"; published in ProceedingGI '05 Proceedings of Graphics Interface, 2005, pp. 137-144.

(Continued)

*Primary Examiner* — Mahfuzur Rahman
*Assistant Examiner* — Darshan Dhruv
(74) *Attorney, Agent, or Firm* — Suiter Swantz pc llo (57) ABSTRACT

Methods and systems for secure web form submission may implement one or more operations including, but not limited to: receiving web content including at least one web form from a web server at a client; determining a value of at least one web form submission security attribute of the at least one web form; and transmitting submission data associated with the at least one web form from the client to the web server according to the value of the web form submission security attribute.

12 Claims, 5 Drawing Sheets

(56) References Cited

U.S. PATENT DOCUMENTS

| | | | |
|---|---|---|---|
| 8,972,740 B2* | 3/2015 | Garrity | G06F 21/33 713/182 |
| 2002/0087479 A1* | 7/2002 | Malcolm | G06F 21/606 705/64 |
| 2002/0112154 A1* | 8/2002 | Wallace, Jr. | H04L 63/0428 713/153 |
| 2004/0080529 A1 | 4/2004 | Wojcik | |
| 2005/0010764 A1* | 1/2005 | Collet | G06F 21/10 713/165 |
| 2006/0070126 A1* | 3/2006 | Grynberg | G06F 21/6263 726/22 |
| 2006/0165060 A1* | 7/2006 | Dua | G06Q 20/20 370/352 |
| 2007/0143430 A1* | 6/2007 | Johnson | G06F 9/544 709/206 |
| 2008/0010377 A1 | 1/2008 | Nissennboim | |
| 2008/0162225 A1* | 7/2008 | Malcolm | G06F 21/606 705/7.11 |
| 2008/0172598 A1* | 7/2008 | Jacobsen | G06F 17/243 715/224 |
| 2009/0271842 A1* | 10/2009 | Baumhof | G06F 21/606 726/1 |
| 2010/0088519 A1* | 4/2010 | Tsuruoka | G06F 21/33 713/176 |
| 2010/0211773 A1* | 8/2010 | Lawrence | H04L 67/02 713/156 |
| 2011/0302405 A1 | 12/2011 | Marlow | |
| 2012/0124375 A1 | 5/2012 | Truskovsky et al. | |
| 2012/0143770 A1 | 6/2012 | Pauker et al. | |
| 2012/0150598 A1* | 6/2012 | Griggs | G06Q 30/06 705/14.16 |
| 2012/0253852 A1* | 10/2012 | Pourfallah | G06Q 20/3276 705/4 |
| 2013/0091358 A1* | 4/2013 | Lund | H04L 9/3273 713/169 |
| 2013/0151848 A1* | 6/2013 | Baumann | H04L 9/3263 713/164 |

OTHER PUBLICATIONS

Adelsbach, Andre, et al., "Visual Spoofing of SSL Protected Web Sites and Effective Countermeasures"; Proceedings of the 1st Information Security Practice and Experience Conference (ISPEC2005), Singapore, Apr. 11-14, 2005, Springer-Verlag, Heidelberg, 2005, 13 pages.
Barth, Adam, et al., "Securing Frame Communication in Browsers"; Communications of the ACM, Jun. 2009, vol. 52, No. 6, pp. 83-91.
Barth, Adam, et al, "Securing Frame Communication in Browsers"; Proceedings of the 17th USENIX Security Symposium, Jul. 2008, 20 pages.
Jackson, Collin, et al., "Beware of Finer-Grained Origins"; In Web2.0 Security and Privacy, 2008, 7 pages.

* cited by examiner

SECURE TRANSPORT OF WEB FORM SUBMISSIONS

BACKGROUND

In order to transport web pages over secured and encrypted channels, web servers and browsers may pass HTTP traffic over SSL/TLS-type connections (also known as HTTPS or Secure HTTP).

The most common visual indication that a web page is being transported over HTTPS is the "lock" icon found in many browsers. When the lock is closed, a user understand that a received page was transported over a secure channel, and when the lock is open, they understand that it was transported insecurely. In addition, in most browsers, double-clicking on the lock icon, (or the first part of the browser's address bar), may result in the display of a SSL/TLS certificate for the sending server, which indicates the authenticity of the sending side.

A problem with the HTTPS implementation, is that the indicators only apply to what is currently being viewed (the current page). If a user visits a web page and the page contains a web form (e.g. some text fields, and a submit button), the user has no way of knowing if the return submission of the form itself will be using HTTPS or clear HTTP. Presently, there is no "secure form" indicator in HTML and contemporary browsers.

This means that when a user is at a log-in page of a web application, even if the login page itself was received over SSL, the user may have no way of knowing if the login itself will be secured prior to its submission. This deficiency is found in many types of sensitive forms such as Credit-Card/Checkout forms, etc. This lack of a secure-submission indicator becomes an even bigger problem in modern Web 2.0/AJAX applications where a user may be looking at a page received securely and the page will spawn a new frame including a form which is overlaid on top of the original page. This new layer is not the actual page previously indicated as being secure, so the user has no knowledge about its origin or if the return submission itself will be over HTTPS or not.

SUMMARY

The present disclosure is directed to systems and methods for indicating to users that a form they are about to submit will be submitted securely. The indication will be given prior to the submission. The indication may be graphical and simple to understand (e.g. a lock icon), and will allow the user to verify the authenticity of the server receiving the submission.

The system may implement a new HTML form attribute called "secure"; and browsers may be configured to employ this form attribute.

Where a form's "secure" attribute is set to "true" it may cause the browser to provide and indication (e.g. a visual indication) alongside the form, and will prevent the form from being submitted over a non-secured channel.

BRIEF DESCRIPTION OF THE DRAWINGS

The numerous advantages of the disclosure may be better understood by those skilled in the art by reference to the accompanying figures in which.

DETAILED DESCRIPTION

Figure 1:
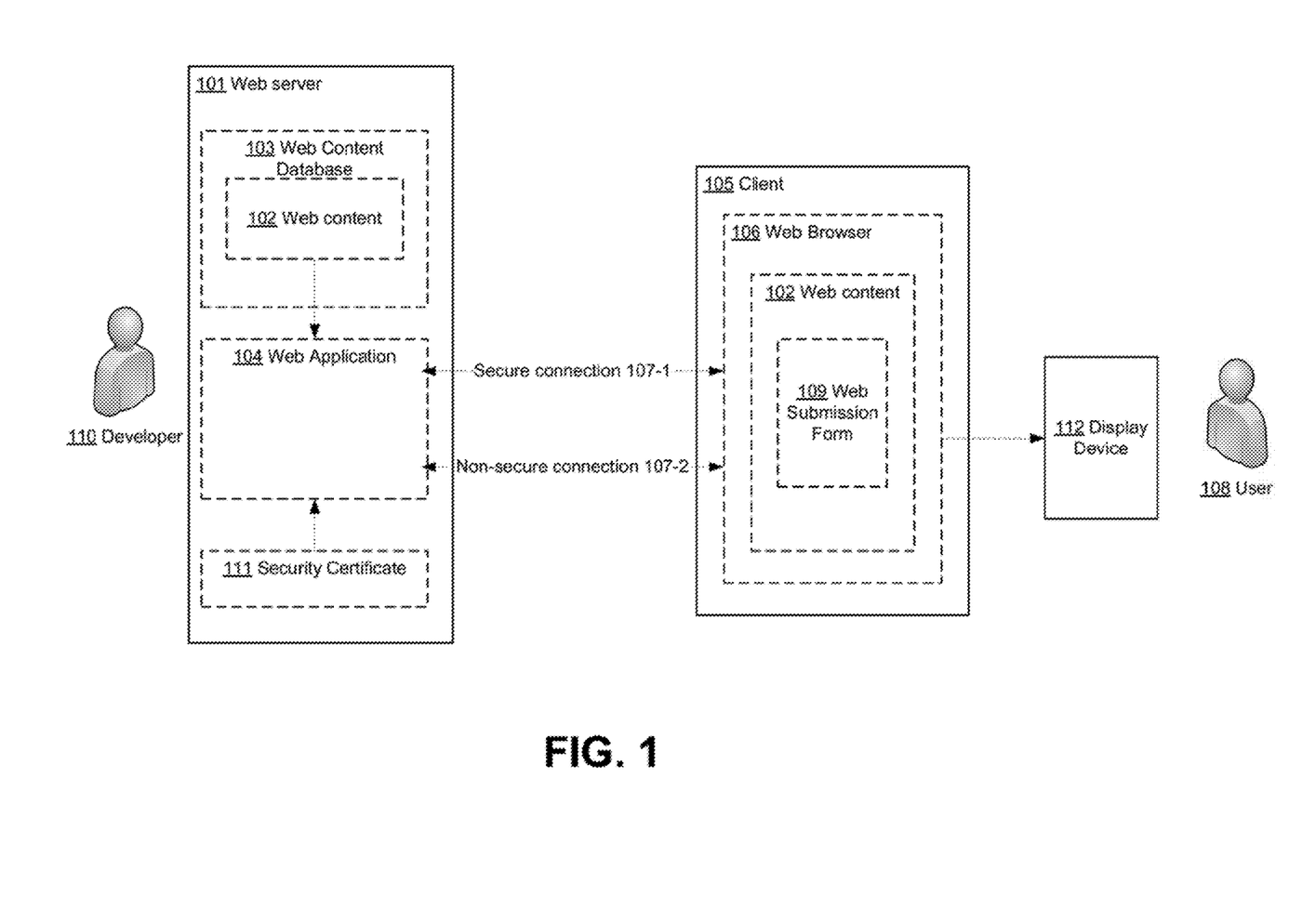
FIG. 1 illustrates a system for secure HTML form data submission.

Referring to FIG. 1, a system 100 for secure HTML form data submission and notification is shown. The system 100 may include a web server 101 maintained by a web service provider/application developer 110. The web server 101 may be configured for storing web content 102 (e.g. one or more web pages) in a web content database 103. The web server 101 may host at least one web application 104 accessible by a client 105 via a web browser 106. The web application 104 may provide the web content 102 to the web browser 106 of the client 105 via a network connection 107. The connection 107 may be a secure connection 107-1 (e.g. an HTTPS connection employing Secure Sockets Layer (SSL) or Transport Layer Security (TLS) cryptographic protocols) or an non-secure connection 107-2 (e.g. a standard HTTP connection that does not employ cryptographic protocols).

Interaction with the web content 102 by a user 108 in the web browser 106 may result in the web browser 106 spawning a web submission form 109 (e.g. an HTML based form configured to prompt the user 108 for submission data to be transmitted back to the web application 104).

It may be the case that the web submission form 109 may include transport sensitive information (e.g. the web submission form 109 is a personally identifiable information (PII-type form). As such, it may be desirable for the web submission form 109 to be transmitted back to the web application 104 by a secure connection 107-1. Alternately, it may be the case that the web submission form 109 may not include transport sensitive information and may be transmitted back to the web application 104 by a non-secure connection 107-2. As such, it may further be desirable to inform a user 108 as to whether secure or non-secure transport mechanisms will be employed.

To provide for such notification, an HTML form attribute (and a corresponding browser behavior) may be employed to indicate to a user 108 that a web submission form 109 will be via a secure connection 107-1 rather than a non-secure connection 107-2.

For example, a binary attribute may be called "SECURE", and may have one of two values—"true" indicating that the form should be submitted over a secure connection 107-1, and "false" (which may be the default if the attribute is not set explicitly), which indicates that the form could be transmitted either over secure connection 107-1 or non-secure connection 107-2.

An exemplary HTML description for a web submission form 109 may be:

```
<FORM ACTION=https://www.some.site/collect_pii.jsp
METHOD="POST" SECURE="true">
    <INPUT TYPE="TEXT" NAME="USERID"
    VALUE=""></INPUT>
    <INPUT TYPE="PASSWORD" NAME="PASSWD"
    VALUE=""></INPUT>
    <INPUT TYPE="SUBMIT" NAME="SUBMIT"
    VALUE="SUBMIT"></INPUT>
</FORM>
```

As can be seen in the HTML description, the "SECURE" attribute may be set at the web server 101 by a web site/application developer 110, and may be used on any forms that transport sensitive information (e.g. PII-type forms).

When the web browser 106 receives a form that includes the "SECURE" attribute which is set to "true" the web browser 106 may perform various certification and notification operations.

Initially, the web browser 106 may validate that the URL for the web submission form 109 (i.e. the "ACTION" attribute of the web submission form 109), is indeed accepting HTTPS communication, and retrieve the certificate of the server before the form submission takes place. For example, the web browser 106 may query the web server 101 for a security certificate 111 associated with the web application 104/web server 101.

Further, the web browser 106 may present a visual indication that the web submission form 109 will be transferred via a secure connection 107-1. For example, similar to the case with received web content 102, the web browser 106 may cause an certification icon indicative of the secure nature of the transport of the web submission form 109 (e.g. a "locked" pad-lock icon) to be presented on a display 112. Specifically, the certification icon may be presented as a pop-up tool-tip adjacent to a "submit" graphical user interface button, a lock icon next to/on-top of the "submit" button, etc. In the manner, the user 108 will be able to verify the URL, web server 101 and the security scheme of the web submission form 109 before its transmission to the web server 101.

Still further, it may be the case that the security certificate 111 of the web server 101 is deficient in some manner. For example, the security certificate 111 may have expired, may not reflect a desired level of security, or may not be present at all. In such a case, the web browser 106 may block the transmission of the web submission form 109 to the web server 101.

In a specific example, a user 108 may visit a site http://www.some.site which includes a landing page https://www.some.site. It may be the case that the developer 110 has placed a form in the main page, and used a "relative" URL (i.e. a link to another web element that is on the same domain as a current page that may omit the domain name in the URL path) to the login page assuming that the user is viewing the page over SSL. The developer may set the "SECURE" attribute to be "true."

Because the developer 110 has used a relative URL, and the user 108 browsed an insecure version of the page, the submission would usually take place over regular HTTP. But since the developer 110 used the SECURE flag on the form, the browser will not send the form submission.

Further, it may be the case that a developer 110 may wait until the last minute (e.g. on-submit or on-click browser events) to modify the actual URL of the web submission form 109 action attribute. In such cases, the mechanism mentioned above will fail, as it will not be able to connect to the final and actual URL of the web submission form 109 and validate that it is using SSL.

In such a case, as previously described, the "SECURE" attribute may be set to "true"; the web browser 106 may validate that the URL for the web submission form 109 is accepting HTTPS communication and retrieve the certificate of the server before the form submission takes place; and the web browser 106 may present a visual indication that the web submission form 109 will be transferred via a secure connection 107-1.

Further, upon submission of the web submission form 109 but before the actual transmission of the web submission form 109 over the secure connection 107-1, the web browser 106 may evaluate the final submission URL. If that URL is the same URL that the browser validated earlier (before the submission), and if it is an HTTPS submission, then the browser continues with the submission. If the URL is a new URL (different than the one in the ACTION attribute of the web submission form 109), the web browser 106 will check if the new URL is using the HTTPS scheme. If the new URL is using the HTTPS scheme, the submission will continue.

If the new URL is not using the HTTPS scheme, an alert may be presented to the user 108 via the display 112 indicating an insecure submission. The alert indication may include one or more of the following information elements: 1) a message stating that the form is about to be submitted over clear text, and ask the user 108 whether or not to continue with the submission or not; and 2) the name of the recipient server and its SSL certificate information. Such information may allow the user 108 to decide if this web submission form 109 should be submitted or not.

It should be noted that the usage of a new HTML from attribute may be backward compatible with existing web sites and browsers. A site that includes this form attribute, and is being viewed by an older browser will still work, but will not provide the added security.

Figure 2:
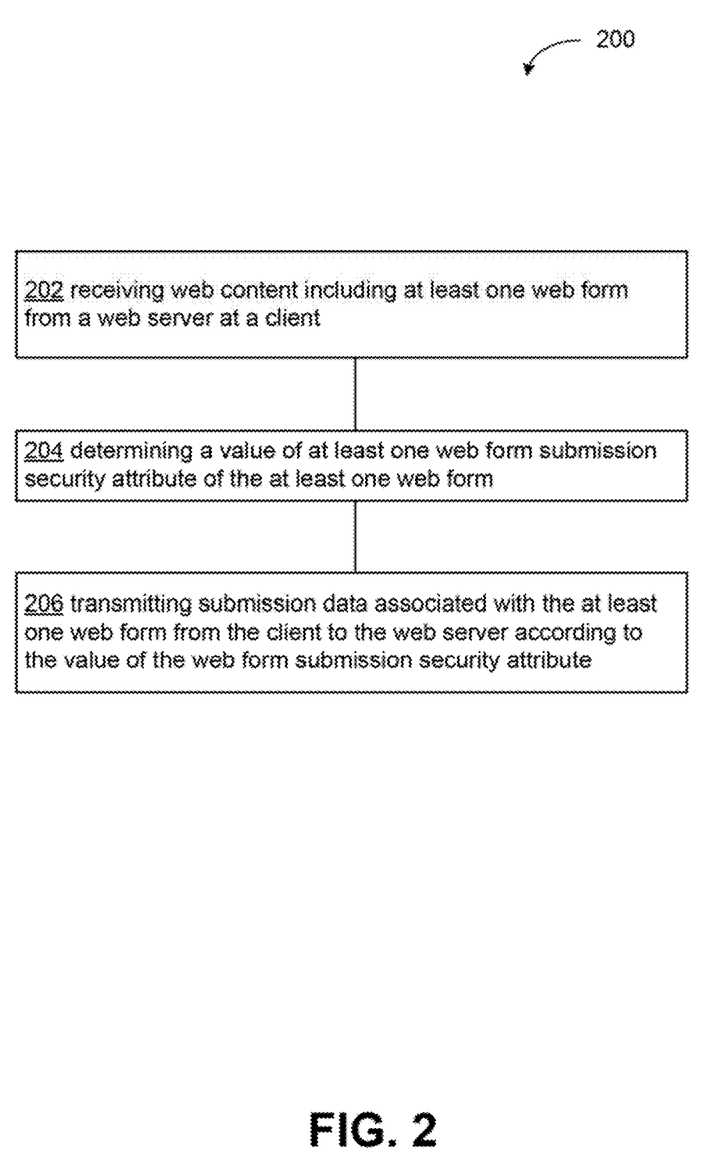
FIGS. 2-5 illustrate operations steps for secure HTML form data submission.

FIG. 2 illustrates an operational flow 200 for secure submission of data associated with at least one web form. Discussion and explanation of the operations of FIG. 2 may be provided with respect to the examples of FIG. 1, and/or with respect to other examples and contexts. However, it should be understood that the operational flows may be executed in a number of other environments and contexts, and/or in modified versions of FIG. 1. In addition, although the various operational flows are presented in the sequence(s) illustrated, it should be understood that the various operations may be performed in other orders than those that are illustrated, or may be performed concurrently.

Operation 202 illustrates receiving web content including at least one web form from a web server at a client. For example, as shown in FIG. 1, a web browser 106 running on a client 105 may receive web content 102 from the web server 101. The web content 102 may include at least one web submission form 109. The at least one web submission form 109 may include one or data entry fields whereby a user 108 may enter submission data into the web submission form 109 to be transmitted back to the web server 101.

Operation 204 illustrates determining a value of at least one web form submission security attribute of the at least one web form. For example, as shown in FIG. 1, it may be the case that the transmission of submission data associated with the web submission form 109 back to the web server 101 may be conducted via a secure connection 107-1 or a non-secure connection 107-2. The client 105 may process the web submission form 109 to determine a value of a security attribute of the web submission form 109 in order to determine the proper connection for transmission of submission data associated with the web submission form 109 back to the web server 101. For example, an exemplary HTML description for a web submission form 109 may be:

```
<FORM ACTION=https://www.some.site/collect_pii.jsp
METHOD="POST" SECURE="true">
    <INPUT TYPE="TEXT" NAME="USERID"
    VALUE=""></INPUT>
    <INPUT TYPE="PASSWORD" NAME="PASSWD"
    VALUE=""></INPUT>
```

-continued

```
    <INPUT TYPE="SUBMIT" NAME="SUBMIT"
    VALUE="SUBMIT"></INPUT>
  </FORM>
```

The client 105 may process the web submission form 109 to determine a value of a security attribute of the web submission form 109 (e.g. whether the "SECURE" attribute is set to "true" or "false"). Such a value may dictate the transfer security of the web submission form 109 back to the web server 101.

Operation 206 illustrates transmitting submission data associated with the at least one web form from the client to the web server according to the value of the web form submission security attribute. Upon determination of the a value of a security attribute of the web submission form 109, the submission data entered by the user 108 into the web submission form 109 may be transmitted back to the web server 101. In the case where the web form security attribute indicates that the transmission is to be via a secure connection (e.g. the "SECURE" attribute is set to "true") the submission data entered by the user 108 into the web submission form 109 may be transmitted to the client 105 via the secure connection 107-1. In the case where the web form security attribute indicates that the transmission is to be via a non-secure connection (e.g. the "SECURE" attribute is not present or is set to "false") the submission data entered by the user 108 into the web submission form 109 may be transmitted to the client 105 via the non-secure connection 107-2 or, alternately, may not be transmitted at all as further described below.

Figure 3:
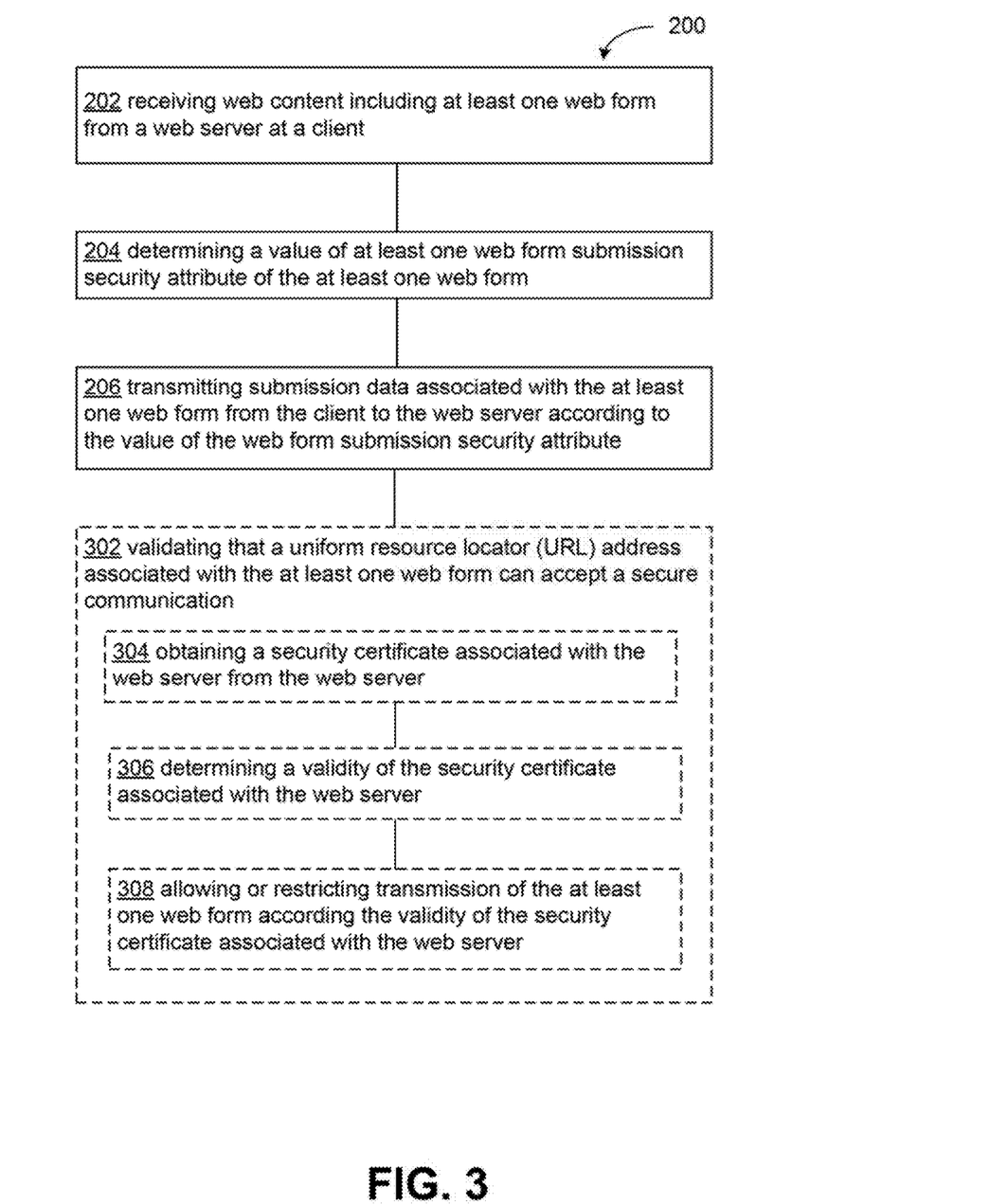

FIG. 3 illustrates alternative embodiments of the example operational flow 200 of FIG. 2. FIG. 3 illustrates example embodiments where the operational flow 200 may include at least one additional operation. Additional operations may include an operation 302.

Operation 302 illustrates validating that a uniform resource locator (URL) address associated with the at least one web form can accept a secure communication. For example, as shown in FIG. 1 and as described above, the client 105 may process the web submission form 109 to determine a value of a security attribute of the web submission form 109 in order to determine the proper connection for transmission of submission data associated with the web submission form 109 back to the web server 101. Upon a determination that the submission data associated with the web submission form 109 it to be transmitted via a secure connection 107-1 (e.g. a "SECURE" attribute of the web submission form 109 is set to "true"), the client 105 may validate that the destination uniform resource locator (URL) address specified by the web submission form 109 can accept a secure communication.

In an exemplary embodiment, operation 302 may include at least one additional operation. Additional operations may include an operation 304, 306 and/or 308.

Operation 304 illustrates obtaining a security certificate associated with the web server from the web server. For example, as shown in FIG. 1, Upon a determination that the submission data associated with the web submission form 109 it to be transmitted via a secure connection 107-1 (e.g. a "SECURE" attribute of the web submission form 109 is set to "true"), the client 105 may query the web server 101 for a security certificate 111 (e.g. a SSL/TLS certificate) associated with the URL specified by the web submission form 109 and maintained by the web server 101.

Operation 306 illustrates determining a validity of the security certificate associated with the web server. As shown in FIG. 1, the client 105 may verify the validity of a security certificate 111 associated with the web server 101. For example, the client 105 may determine whether or not the security certificate 111 has expired, whether or not the security certificate 111 reflects a desired level of security or whether or not the security certificate 111 is present at all.

Operation 308 illustrates allowing or restricting transmission of the at least one web form according the validity of the security certificate associated with the web server. As shown in FIG. 1, upon a determination of the validity or non-validity of the security certificate 111, the client may allow or restrict the transmission of the submission data associated with the web submission form 109 accordingly. In a case where the security certificate 111 is deficient in some manner (e.g. expired), the client 105 may block the transmission of the submission data associated with the web submission form 109 to the web server 101. In a case where the security certificate 111 is valid, the client 105 may allow the transmission of the submission data associated with the web submission form 109 to the web server 101 across the secure connection 107-1.

Figure 4:
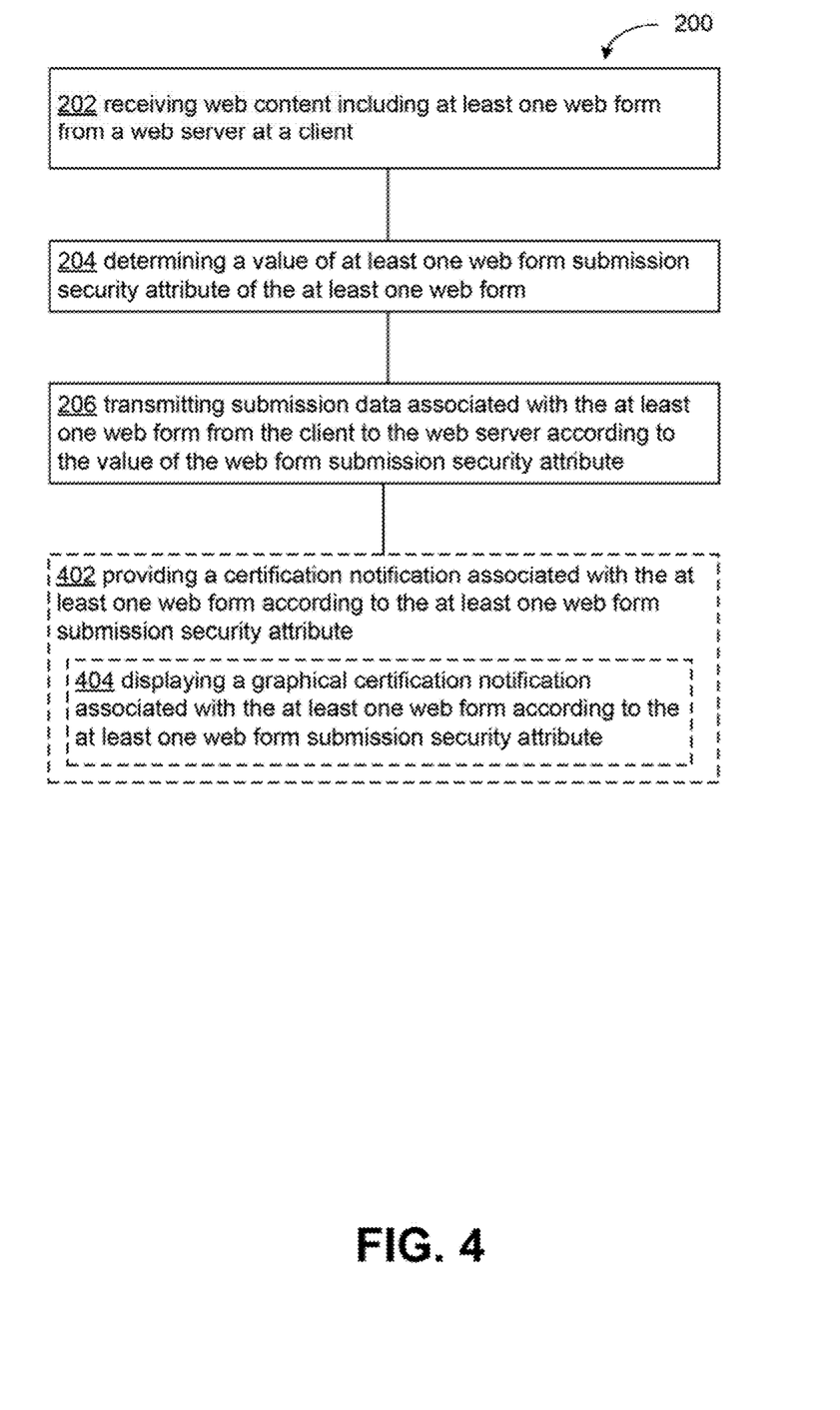

FIG. 4 illustrates alternative embodiments of the example operational flow 200 of FIG. 2. FIG. 4 illustrates example embodiments where the operational flow 200 may include at least one additional operation. Additional operations may include an operation 402 and/or 404.

Operation 402 illustrates providing a certification notification associated with the at least one web form according to the at least one web form submission security attribute. For example, as shown in FIG. 1, the client 105 may process the web submission form 109 to determine a value of a security attribute of the web submission form 109 in order to determine the proper connection for transmission of submission data associated with the web submission form 109 back to the web server 101 (e.g. whether the "SECURE" attribute is set to "true" or "false"). Upon such determination, the client 105 may provide a certification notification (e.g. a graphical, audio, textual notification) to a user 108 indicating the secure or non-secure nature of the transmission of submission data associated with the web submission form 109.

In an exemplary embodiment, operation 402 may include at least one additional operation. Additional operations may include an operation 404.

Operation 404 illustrates displaying a graphical certification notification associated with the at least one web form according to the at least one web form submission security attribute. For example, as shown in FIG. 1, the client 105 may process the web submission form 109 to determine a value of a security attribute of the web submission form 109 in order to determine the proper connection for transmission of submission data associated with the web submission form 109 back to the web server 101 (e.g. whether the "SECURE" attribute is set to "true" or "false"). Upon such determination, the display 112 associated with client 105 may display a graphical notification (e.g. a pictorial and/or textual notification) to a user 108 indicating the secure or non-secure nature of the transmission of submission data associated with the web submission form 109.

Figure 5:
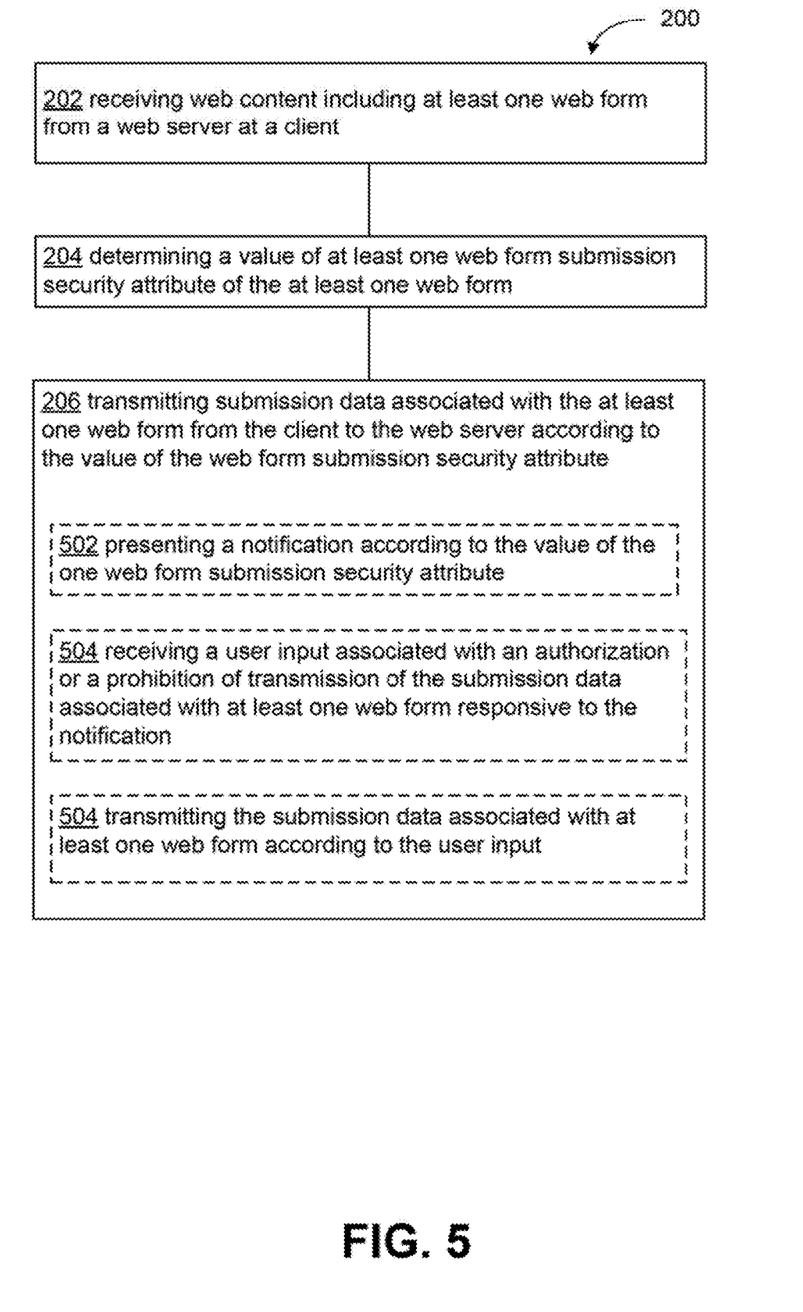

FIG. 5 illustrates alternative embodiments of the example operational flow 200 of FIG. 2. FIG. 5 illustrates example embodiments where the operation 206 of operational flow 200 may include at least one additional operation. Additional operations may include an operation 502, 504 and/or 506.

Operation 502 illustrates providing a certification notification associated with the at least one web form according to the at least one web form submission security attribute. For example, as shown in FIG. 1, the client 105 may process the web submission form 109 to determine a value of a security attribute of the web submission form 109 in order to determine the proper connection for transmission of submission data associated with the web submission form 109 back to the web server 101 (e.g. whether the "SECURE" attribute is set to "true" or "false"). Upon such determination, the client 105 may provide a certification notification (e.g. a graphical, audio, textual notification) to a user 108 indicating the secure or non-secure nature of the transmission of submission data associated with the web submission form 109.

Operation 504 illustrates receiving a user input associated with an authorization or a prohibition of transmission of the submission data associated with at least one web form responsive to the notification. For example, as shown in FIG. 1, up notification of the secure or non-secure nature of the transmission of submission data associated with the web submission form 109, the user 108 may decide whether or not to authorize or prohibit the transmission of the submission data associated with the web submission form 109. The client 105 may include one or more user input devices (e.g. a key pad, mouse, touch screen etc.) configured to receive a user input associated with such authorization or prohibition. For example the display 112 may indicate that the security attribute of the web submission form 109 indicates that the transmission of the submission data associated with the web submission form 109 will be non-secure (e.g. the "SECURE" attribute is set to "false") and ask the user 108 whether or not they wish to continue with the transmission. The client 105 may then receive the user input indicative of the choice of the user 108.

Operation 506 illustrates transmitting the submission data associated with at least one web form according to the user input. For example, as shown in FIG. 1, upon receipt of user input indicative of an authorization or prohibition of transmission of the of the submission data associated with the web submission form 109 the client 105 may transmit the submission data associated with the web submission form 109 to the web server 101 accordingly. For example, in the case where the security attribute of the web submission form 109 indicates that the transmission of the submission data associated with the web submission form 109 will be non-secure and the user has provided a user input indicating that the transmission is still to be carried out, the client 105 may transmit the submission data associated with the web submission form 109 to the web server 101 over a non-secure connection 107-2. In the case where the security attribute of the web submission form 109 indicates that the transmission of the submission data associated with the web submission form 109 will be non-secure and the user has provided a user input indicating that the transmission is not authorized, the client 105 may block transmission of the submission data associated with the web submission form 109 to the web server 101.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art may include progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

It is believed that the present invention and many of its attendant advantages will be understood by the foregoing description. It may be also believed that it will be apparent that various changes may be made in the form, construction and arrangement of the components thereof without departing from the scope and spirit of the invention or without sacrificing all of its material advantages. The form herein before described being merely an explanatory embodiment thereof. It may be the intention of the following claims to encompass and include such changes.

What is claimed:

1. A method for secure submission of data associated with at least one web form comprising:
   receiving web content from a web server at a client, the web content including at least one web submission form configured to prompt a user for first submission data to be transmitted, the web submission form including at least one security attribute, wherein the at least one security attribute includes a binary HTML attribute indicating the security of a connection to the web server via which the first submission data is transmitted;
   processing the at least one web submission form to determine a value of the at least one security attribute;
   obtaining from the web server at least one security certificate associated with the web server;
   determining a validity of the at least one security certificate;
   validating that a uniform resource locator (URL) address associated with the at least one web submission form accepts a secure communication;
   determining that a submission URL is different from the validated URL;
   determining whether the submission URL accepts a secure communication; and
   at least one of allowing and restricting transmission of the first submission data from the client to the web server according to at least one of the value of the at least one security attribute and the validity of the at least one security certificate.

2. The method of claim 1, further comprising:
   providing a certification notification associated with the at least one web submission form according to the value of the at least one security attribute.

3. The method of claim 2, wherein the providing a certification notification associated with the at least one web submission form according to the value of the at least one security attribute includes:
   displaying a graphical certification notification associated with the at least one web submission form according to the value of the at least one security attribute.

4. The method of claim 1, wherein the at least one of allowing and restricting transmission of the first submission data from the client to the web server according to at least one of the value of the at least one security attribute and the validity of the at least one security certificate further comprises:
   providing a certification notification associated with the at least one web submission form according to the value of the at least one security attribute;
   receiving a user input associated with an authorization or a prohibition of transmission of second submission data associated with at least one web form responsive to the notification; and
   transmitting the second submission data associated with at least one web form according to the user input.

5. A system for secure web form submission comprising:
   means for receiving web content from a web server at a client, the web content including at least one web submission form configured to prompt a user for first submission data to be transmitted, the web submission form including at least one security attribute, wherein the at least one security attribute includes a binary HTML attribute indicating the security of a connection to the web server via which the first submission data is transmitted;
   means for processing the at least one web submission form to determine a value of the at least one security attribute;
   means for obtaining from the web server at least one security certificate associated with the web server;
   means for determining a validity of the at least one security certificate;
   means for validating that a uniform resource locator (URL) address associated with the at least one web submission form accepts a secure communication;
   means for determining that a submission URL is different from the validated URL;
   means for determining whether the submission URL accepts a secure communication; and
   means for at least one of allowing and restricting transmission of the first submission data from the client to the web server according to at least one of the value of the at least one security attribute and the validity of the at least one security certificate.

6. The system of claim 5, further comprising:
   means for providing a certification notification associated with the at least one web submission form according to the value of the at least one security attribute.

7. The system of claim 6, wherein the means for providing a certification notification associated with the at least one web submission form according to the value of the at least one security attribute includes:
   means for displaying a graphical certification notification associated with the at least one web submission form according to the value of the at least one security attribute.

8. The system of claim 5, wherein the means for at least one of allowing and restricting transmission of the first submission data from the client to the web server according to at least one of the value of the at least one security attribute and the validity of the at least one security certificate further comprises:
   means for providing a certification notification associated with the at least one web submission form according to the value of the at least one security attribute;
   means for receiving a user input associated with an authorization or a prohibition of transmission of second submission data associated with at least one web form responsive to the notification; and
   means for transmitting the second submission data associated with at least one web form according to the user input.

9. A non-transitory computer-readable medium tangibly embodying computer readable instructions for execution by a computing device, the instructions comprising:
   instructions for receiving web content from a web server at a client, the web content including at least one web submission form configured to prompt a user for first submission data to be transmitted, the web submission form including at least one security attribute, wherein the at least one security attribute includes a binary HTML attribute indicating the security of a connection to the web server via which the first submission data is transmitted;
   instructions for processing the at least one web submission form to determine a value of the at least one security attribute;

instructions for obtaining from the web server at least one security certificate associated with the web server;

instructions for determining a validity of the at least one security certificate;

instructions for validating that a uniform resource locator (URL) address associated with the at least one web submission form accepts a secure communication;

instructions for determining that a submission URL is different from the validated URL;

instructions for determining whether the submission URL accepts a secure communication; and instructions for at least one of allowing and restricting transmission of the first submission data from the client to the web server according to at least one of the value of the at least one security attribute and the validity of the at least one security certificate.

10. The non-transitory computer-readable medium of claim 9, further comprising:

instructions for providing a certification notification associated with the at least one web submission form according to the value of the at least one security attribute.

11. The non-transitory computer-readable medium of claim 10, wherein the instructions for providing a certification notification associated with the at least one web submission form according to the value of the at least one security attribute comprises:

instructions for displaying a graphical certification notification associated with the at least one web submission form according to the value of the at least one security attribute.

12. The non-transitory computer-readable medium of claim 9, wherein the instructions for at least one of allowing and restricting transmission of the first submission data from the client to the web server according to at least one of the value of the at least one security attribute and the validity of the at least one security certificate further comprises:

instructions for providing a certification notification associated with the at least one web submission form according to the value of the at least one security attribute;

instructions for receiving a user input associated with an authorization or a prohibition of transmission of second submission data associated with at least one web form responsive to the notification; and instructions for transmitting the second submission data associated with at least one web form according to the user input.

* * * * *

UNITED STATES PATENT AND TRADEMARK OFFICE
CERTIFICATE OF CORRECTION

PATENT NO. : 10,068,083 B2
APPLICATION NO. : 13/629902
DATED : September 4, 2018
INVENTOR(S) : Ori Segal and Orli Gan It is certified that error appears in the above-identified patent and that said Letters Patent is hereby corrected as shown below:

On the Title Page

Item (72) Inventors: should read as follows:
Ori Segal, Tel Aviv (IL);
Orli Gan, Tel Aviv (IL)

Signed and Sealed this
Eleventh Day of June, 2024

*Katherine Kelly Vidal*

Katherine Kelly Vidal
*Director of the United States Patent and Trademark Office*